(12) United States Patent
Huang et al.

(10) Patent No.: US 10,335,911 B1
(45) Date of Patent: Jul. 2, 2019

(54) TOOL HOLDER ASSEMBLY MOUNTABLE ON A MACHINE SPINDLE HAVING A SPINDLE COOLANT CHANNEL

(71) Applicant: PRECISION MACHINERY RESEARCH AND DEVELOPMENT CENTER, Taichung (TW)

(72) Inventors: Hsing-Chieh Huang, Taichung (TW); Chi-Cheng Kuo, Taichung (TW); Ching-Kuo Wu, Taichung (TW)

(73) Assignee: Precision Machinery Research and Development Center, Taichung (TW)

( * ) Notice: Subject to any disclaimer, the term of this patent is extended or adjusted under 35 U.S.C. 154(b) by 27 days.

(21) Appl. No.: 15/858,375

(22) Filed: Dec. 29, 2017

(51) Int. Cl.
   *B23Q 11/10* (2006.01)
   *B23B 31/02* (2006.01)
   *B23Q 5/04* (2006.01)

(52) U.S. Cl.
   CPC .......... *B23Q 11/1023* (2013.01); *B23B 31/02* (2013.01); *B23Q 5/04* (2013.01); *B23B 2231/0296* (2013.01); *B23B 2231/24* (2013.01); *Y10T 279/17111* (2015.01); *Y10T 408/455* (2015.01); *Y10T 409/304032* (2015.01)

(58) Field of Classification Search
   CPC ............ B23Q 11/1015; B23Q 11/1023; B23B 2231/24; Y10T 279/17111; Y10T 408/45; Y10T 408/455; Y10T 409/304032
   See application file for complete search history.

(56) References Cited

U.S. PATENT DOCUMENTS

| 3,487,748 A * | 1/1970 | Grage .................. B23Q 1/0036 408/135 |
| 3,568,566 A * | 3/1971 | Weidig .................. B23B 31/261 408/239 R |
| 4,662,043 A * | 5/1987 | Stone .................... B23B 31/204 198/345.3 |
| 4,844,671 A * | 7/1989 | Reinauer ............... B23B 31/261 409/233 |
| 5,690,137 A * | 11/1997 | Yamada ............... B23Q 1/0036 137/240 |
| 6,602,031 B2 * | 8/2003 | Hara ........................ F16N 7/32 408/59 |
| 7,367,097 B2 * | 5/2008 | Nakamura ............ B23B 31/261 29/27 C |
| 2010/0201083 A1* | 8/2010 | Hangleiter ............ B23B 31/265 279/50 |

(Continued)

*Primary Examiner* — Alan Snyder
*Assistant Examiner* — Yasir A Diab
(74) *Attorney, Agent, or Firm* — Michael Best & Friedrich LLP

(57) ABSTRACT

A tool holder assembly includes a holder body, a pull stud and a flow adjustment unit. The holder body has a holder coolant channel extending through a first end and a second end thereof. The pull stud has an insertion portion, a grip portion, and a longitudinal passage extending through the insertion portion and the grip portion, and fluidly communicating with the holder coolant channel. The flow adjustment unit includes a connection tube that extends into the longitudinal passage and projects outwardly from the grip portion, a resilient member urging the connection tube to project outwardly from the grip portion, and a flow guide channel extending through the connection tube and fluidly communicating with the holder coolant channel.

11 Claims, 6 Drawing Sheets

(56) References Cited

U.S. PATENT DOCUMENTS

2010/0272530 A1\* 10/2010 Rozzi ................. B23Q 11/1015
408/56
2011/0052342 A1\* 3/2011 Hongou .................. B23B 29/04
409/231

\* cited by examiner

TOOL HOLDER ASSEMBLY MOUNTABLE ON A MACHINE SPINDLE HAVING A SPINDLE COOLANT CHANNEL

FIELD

The disclosure relates to a tool holder assembly, and more particularly to a tool holder assembly mountable on a machine spindle having a spindle coolant channel.

BACKGROUND

There are prior arts, for example, those disclosed in Taiwanese Utility Model Patent Nos. M534055 and M541362, which provide a machine spindle having a collet to clamp a pull stud of a tool holder and to thereby position a tapered end of the tool holder assembly to the machine spindle.

Referring to FIGS. 1 and 2, when a collet 101 of a machine spindle 1 is loosened and placed in an open state, and a tool holder assembly 2 extends into the machine spindle 1, a pull stud 201 of the tool holder assembly 2 abuts a drawbar 102 of the machine spindle 1 but is not clamped by the collet 101. The pull stud 201 has an enlarged connection head 202.

As shown in FIG. 3, when the collet 101 is moved upward and tightened, the enlarged connection head 202 is clamped by the collet 101 and a spacing (S) is formed between the enlarged connection head 202 and the drawbar 102.

In general, the tool holder assembly 2 is detachably connected to the machine spindle 1. The machine spindle 1 and the tool holder assembly 2 assembled together are commonly applied in industries, such as aerospace industries, to process thin workpieces at high speed. The processing operation of the tool holder assembly 2 requires a cryogenic fluid to cool down the workpieces for preventing the workpieces from being melted and becoming sticky. For example, in a low-temperature cutting process, processing temperatures are divided into three zones, a first zone (2-6° C.), a second zone (0-30° C.) and a third zone (<−50° C.). The cryogenic fluid is generally liquid nitrogen. The cryogenic fluid is delivered from the machine spindle 1 to the tool holder assembly 2 passing through the drawbar 102. Because the enlarged connection head 202 and the drawbar 102 has the spacing (S) therebetween, which has a cross section larger than flow passages (P1, P2) of the connection head 202 and the drawbar 102, the cryogenic fluid flowing through the spacing (S) can encounter a pressure drop in the spacing (S) (FIG. 3). Due to the pressure drop, the cryogenic fluid is gasified as shown by arrows in FIG. 3, thereby causing a change or an increase in temperature of the cryogenic fluid reaching the tip of a cutter (not shown) which adversely affects the efficiency of low-temperature cutting.

If the existing tool holder assembly of the type as described above is applied in aerospace industries, it may cause workpieces to melt during its processing operation.

SUMMARY

Therefore, an object of the disclosure is to provide a tool holder assembly that can alleviate at least one of the drawbacks of the prior art.

According to the disclosure, a tool holder assembly includes a holder body, a pull stud and a flow adjustment unit. The holder body extends along an axial line, and has a first end, a second end opposite to the first end along the axial line, and a holder coolant channel extending through the first end and the second end along the axial line. The pull stud extends along the axial line into the holder body through the first end, and has an insertion portion, a grip portion and a longitudinal passage. The insertion portion is disposed adjacent to the first end. The grip portion is opposite to the insertion portion along the axial line. The longitudinal passage extends through the insertion portion and the grip portion along the axial line, and fluidly communicating with the holder coolant channel. The flow adjustment unit includes a connection tube extending into the longitudinal passage, a resilient member urging the connection tube to project outwardly from the grip portion, and a flow guide channel extending through the connection tube and fluidly communicating with the holder coolant channel.

The tool holder assembly is mountable on a machine spindle having a spindle coolant channel, a drawbar and a collet. By virtue of the structural arrangement of the flow adjustment unit, the flow guide channel of the connection tube can be kept in an airtight connection with the drawbar. Therefore, when a cryogenic fluid flows through the spindle coolant channel and the tool holder assembly of the present disclosure, gasification of the cryogenic fluid can be prevented.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 4:
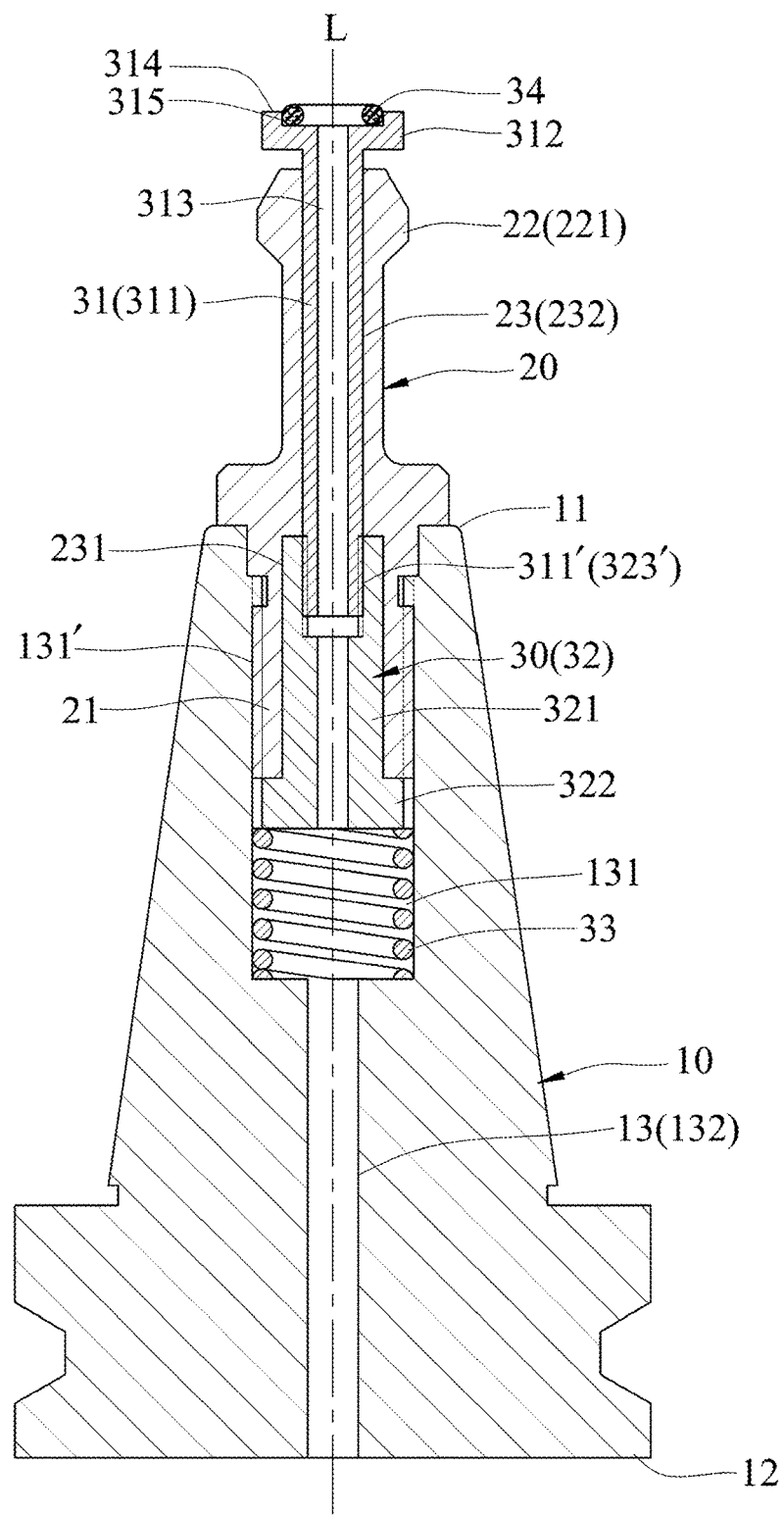
FIG. 4 is a sectional view, illustrating a tool holder assembly according to an embodiment of the present disclosure.
Figure 5:
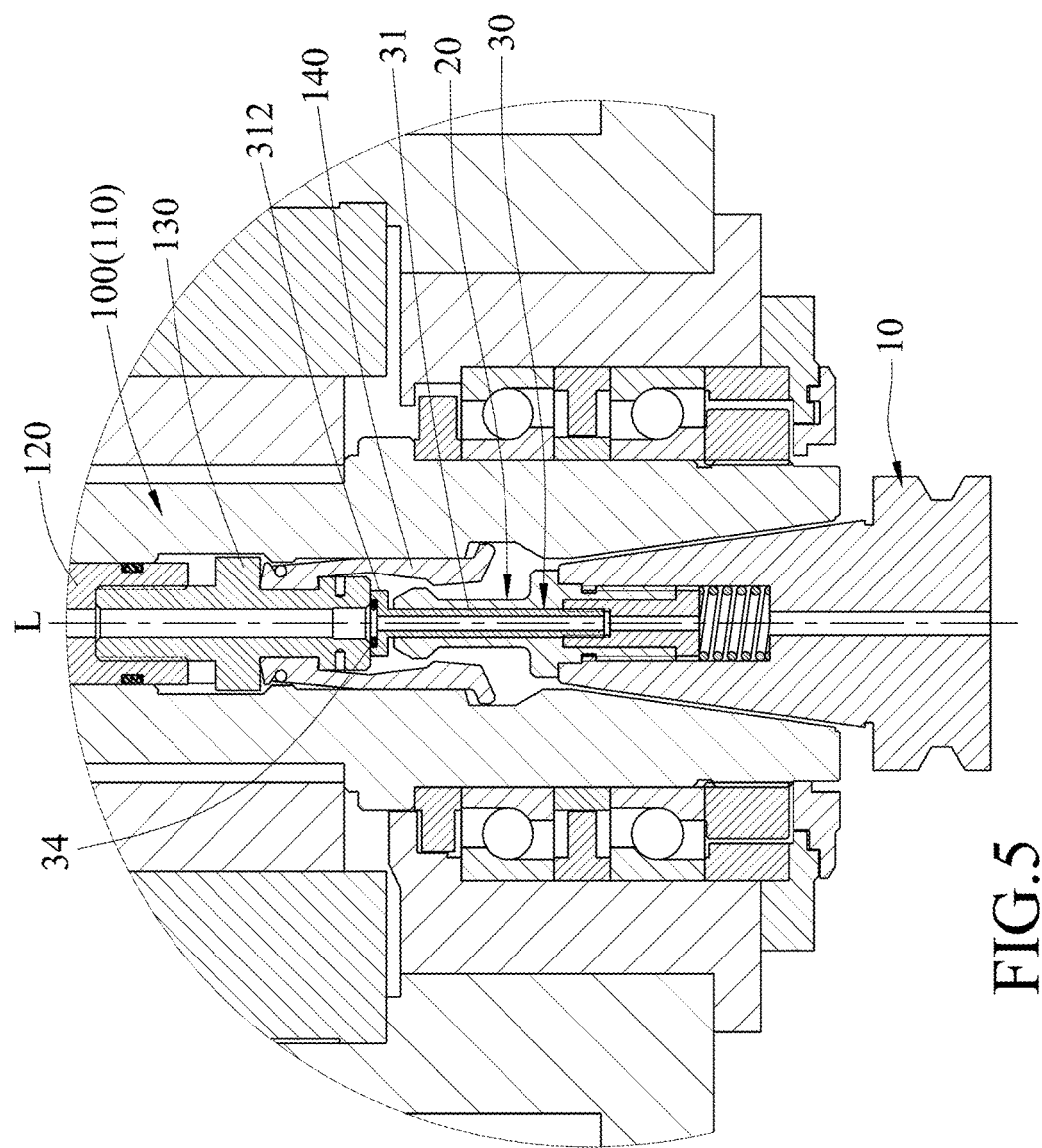
FIG. 5 is a sectional view of the embodiment, illustrating a pull stud of the tool holder assembly unclamped by a collet of a machine spindle.

Referring to FIGS. 4 and 5, a tool holder assembly according to an embodiment of the present disclosure suitable for mounting on a machine spindle 100 is shown. The machine spindle 100 has a spindle main tube body 110 extending along an axial line (L), a drawbar tube 120 disposed in the main tube body 110, a drawbar 130 connected to the drawbar tube 120, and a collet 140 coupled to and moved by the drawbar 130. The drawbar tube 120 is movable in the main tube body 110 along the axial line (L) so as to move the collet 140. During the movements of the drawbar tube 120, the collet 140 can be moved to a non-clamping state (see FIG. 5) or a clamping state (see FIG. 6) by virtue of a variable internal shape of the main tube body 110. The tool holder assembly of the present disclosure includes a holder body 10, a pull stud 20 and a flow adjustment unit 30.

The holder body 10 extends along the axial line (L), and has a first end 11, a second end 12 opposite to the first end 11 along the axial line (L), and a holder coolant channel 13 extending through the first end 11 and the second end 12 along the axial line (L). The holder coolant channel 13 has a stepwise configuration and has an enlarged channel section 131 that is proximal to the first end 11 of the holder body 10, and a narrowed channel section 132 that connects the enlarged channel section 131 along the axial line (L) and that is proximal to the second end 12 of the holder body 10. Within the enlarged channel section 131, an internally threaded segment 131' is provided on the holder body 10 adjacent to the first end 11 thereof. Although the holder body 10 has a configuration generally similar to that of the existing holder body, the enlarged channel section 131 has a relatively large depth compared to that of the existing holder body shown in FIG. 1.

The pull stud 20 extends along the axial line (L) into the holder body 10 through the first end 11, and has an insertion portion 21, a grip portion 22, and a longitudinal passage 23. The insertion portion 21 extends into the holder coolant channel 13 through the first end 11, and is threadedly connected to the internally threaded segment 131'. The grip portion 22 is opposite to the insertion portion 21 along the axial line (L). The longitudinal passage 23 extends through the insertion portion 21 and the grip portion 22 along the axial line (L), and fluidly communicates with the holder coolant channel 13. Specifically, the grip portion 22 is configured to be pulled by the collet 140 and disposed oppositely of the insertion portion 21 and outwardly of the holder coolant channel 13. The grip portion 22 has an enlarged connection head 221. The longitudinal passage 23 has a stepwise configuration, and has an enlarged passage section 231 disposed in the insertion portion 21, and a narrowed passage section 232 connected to the enlarged passage section 231 and extending through the enlarged connection head 221.

The flow adjustment unit 30 includes a connection tube 31 extending into the longitudinal passage 23, a retention tube 32 threadedly connected to the connection tube 31, a resilient member 33 urging the connection tube 31 to project outwardly from the grip portion 22, a flow guide channel 313 extending through the connection tube 31 and the retention tube 32 and fluidly communicating with the holder coolant channel 13, and a seal ring 34.

The connection tube 31 extends into the longitudinal passage 23 and projects outwardly from the grip portion 22, and is configured to sealingly abut the drawbar 130 of the machine spindle 100. In particular, the connection tube 31 has a tube portion 311 slidably extending through the narrowed passage section 232 of the longitudinal passage 23, and an abutment end 312. The abutment end 312 has a disc-like shape and is connected to the tube portion 311. The tube portion 311 has an externally threaded section 311' opposite to the abutment end 312. The abutment end 312 is disposed at the outside of the grip portion 22, and has an end surface 314 perpendicular to the axial line (L).

The retention tube 32 has a stepwise shape and is mounted in the pull stud 20 and the holder body 10. Particularly, the retention tube 32 is connected to the connection tube 31 within the pull stud 20 and partially extends into the holder coolant channel 13 of the holder body 10. The retention tube 32 has an upper section 321 extending into the enlarged passage section 231, and a lower section 322 that is connected to the upper section 321 and that is disposed within the enlarged channel section 131. The lower section 322 is widened relative to the upper section 321, and is limited in the enlarged channel section 131. A threaded section 323' of the upper section 321 is threadedly connected to the externally threaded section 311' of the tube portion 311.

The flow guide channel 313 extends through the tube portion 311 and the abutment end 312 of the connection tube 31, and the upper and lower sections 321, 322 of the retention tube 32, and fluidly communicates with the holder coolant channel 13. The flow guide channel 313 is a stepwise hole that has a widened channel part 315 in the abutment end 312. The widened channel part 315 is concaved from the end surface 314. In other words, the widened channel part 315 of the flow guide channel 313 opens at the end surface of the abutment end 312.

The resilient member 33 abuts the holder body 10 and the retention tube 32, and is disposed in the enlarged channel section 131.

The seal ring 34 is configured to sealingly abut the drawbar 130 of the machine spindle 100. The seal ring 34 is disposed in the widened channel part 315 and is adjacent to the end surface 314.

Referring back to FIG. 4, the flow adjustment unit 30 is assembled by virtue of the threaded connection of the threaded section 323' of the retention tube 32 and the externally threaded section 311' of the connection tube 31. Because the lower section 322 of the retention tube 32 is widened, the lower section 322 can be kept within the enlarged channel section 131 of the holder body 10, and the upper section 321 is permitted to slide limitedly in the enlarged passage section 231 of the pull stud 23 along the axial line (L). Further, because the abutment end 312 of the connection tube 31 is enlarged compared to the tube portion 311 of the connection tube 31, the connection tube 31 can be limited from moving overly within the pull stud 20. In a normal state, by virtue of resiliency of the resilient member 33, the lower section 322 of the retention tube 32 abuts the insertion portion 21 of the pull stud 20, and the abutment end 312 of the connection tube 31 projects outwardly to a distance from the enlarged connection head 221. In this situation, the seal ring 34 is not subjected to an external force and projects outwardly from the end surface 314 of the abutment end 312.

Referring back to FIG. 5, the drawbar tube 120 is moved downwardly relative to the spindle main tube body 110 to loosen the collet 140, and the tool holder assembly of the present disclosure is inserted into the spindle main tube body 110. When the abutment end 312 abuts a bottom end of the drawbar 130, a top end of the seal ring 34 abuts the bottom end of the drawbar 130, and the tool holder assembly of the present disclosure is temporally and axially positioned relative to the machine spindle 100.

Figure 6:
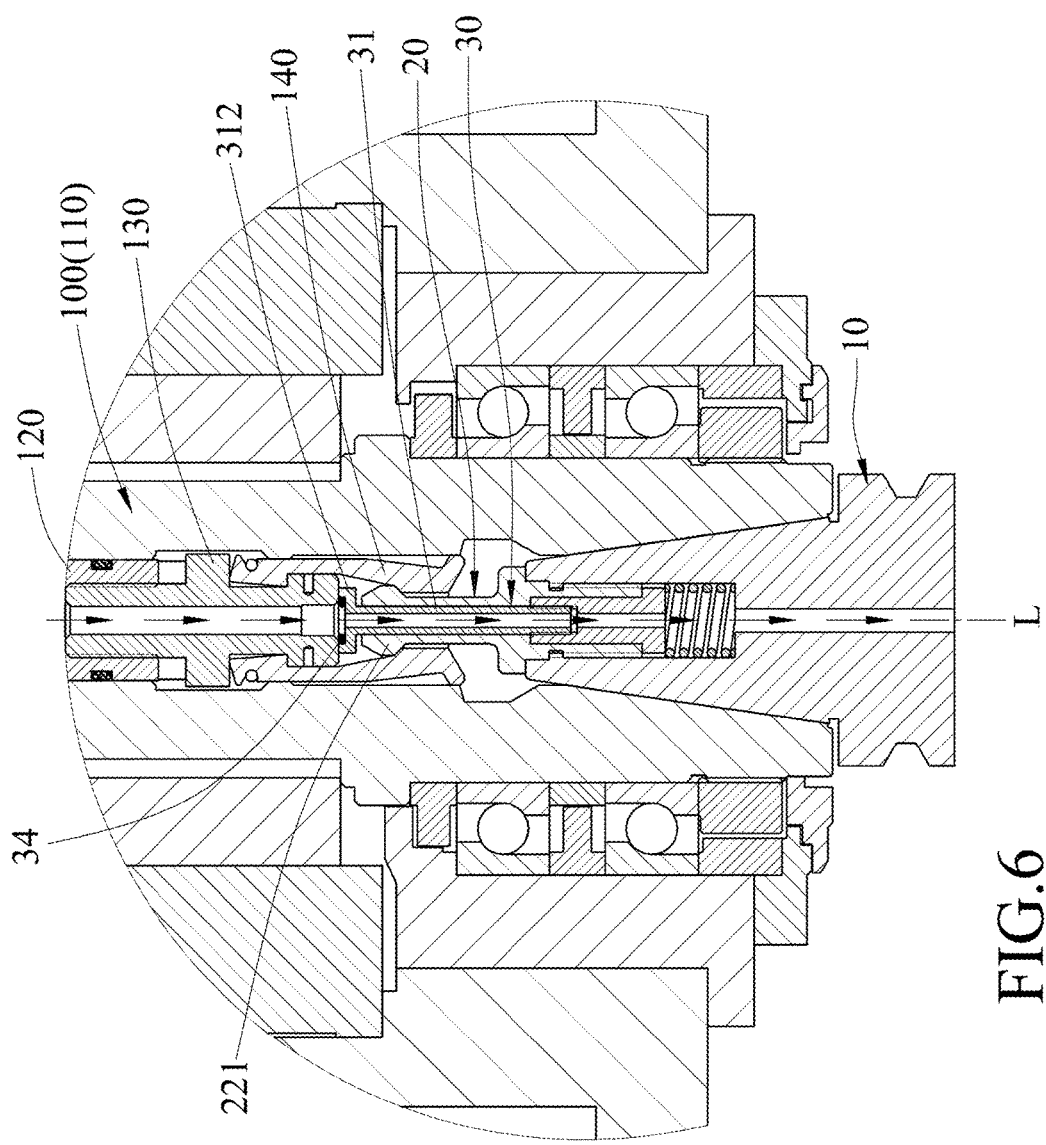
FIG. 6 is similar to the FIG. 5, but illustrating the pull stud of the tool holder assembly clamped by the collet of the machine spindle.

Referring to FIG. 6, when the drawbar tube 120 moved upwardly relative to the spindle main tube body 110 along the axial line (L) to tighten the collet 140, the enlarged connection head 221 of the pull stud 20 is clamped and pulled by the collet 140 to firmly position the tool holder assembly of the present disclosure to the machine spindle 100. At this time, the seal ring 34 is pressed and deformed by the bottom end of the drawbar 130, and the abutment end 312 of the connection tube 31 sealingly abuts the drawbar 130.

The tool holder assembly of the present disclosure assembled with the machine spindle 100 may be applied in aerospace industries to process thin workpieces at high speeds. When a cryogenic fluid is delivered from the spindle main tube body 110 to the second end 12 of the holder body 12 (see FIG. 6) to cool the workpieces, because the connection tube 31 is sealingly connected to the drawbar 130 without forming any spacing therebetween, gasification of the cryogenic fluid due to pressure drop can be prevented before the cryogenic fluid flows to the tip of a cutter through the flow guide channel 313 of the flow adjustment unit 30. This situation is advantageous for high-speed processing of the workpieces. The problem of causing the workpieces to melt and become sticky is therefore avoided.

Figure 1:
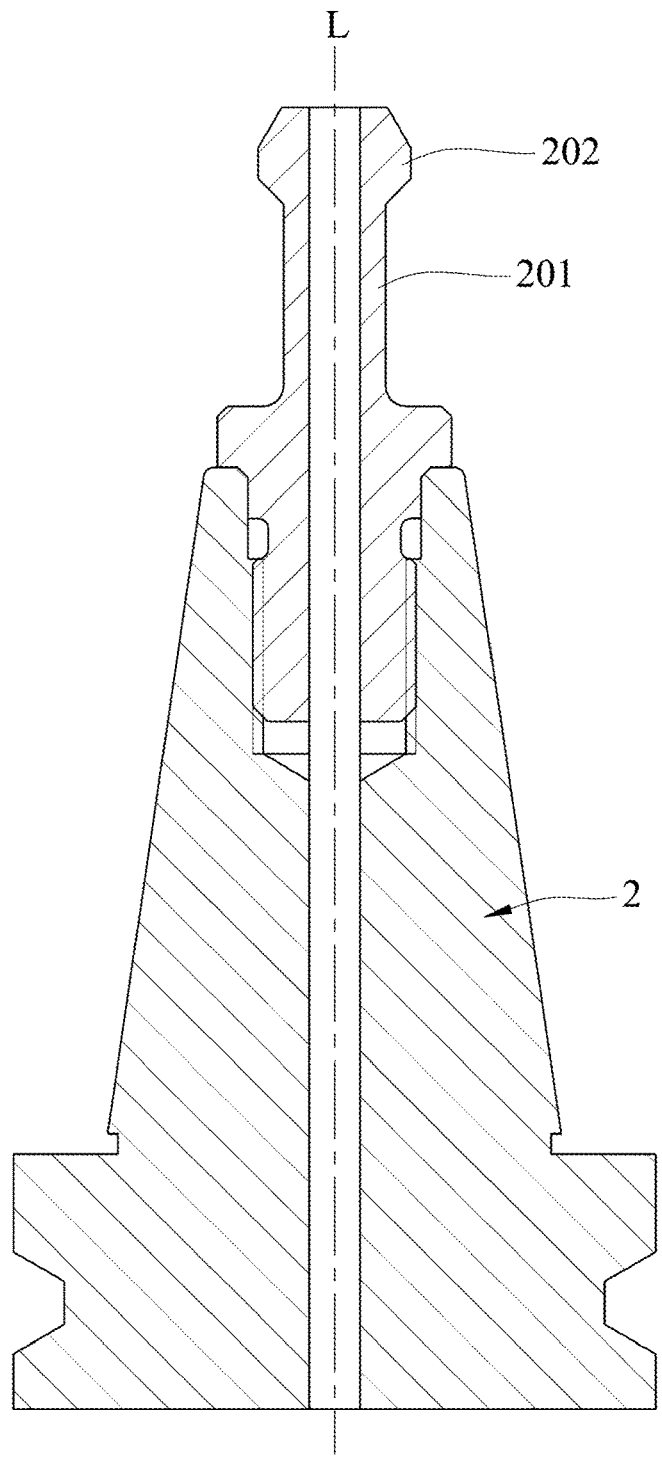
FIG. 1 is a sectional view of an existing tool holder assembly.
Figure 2:
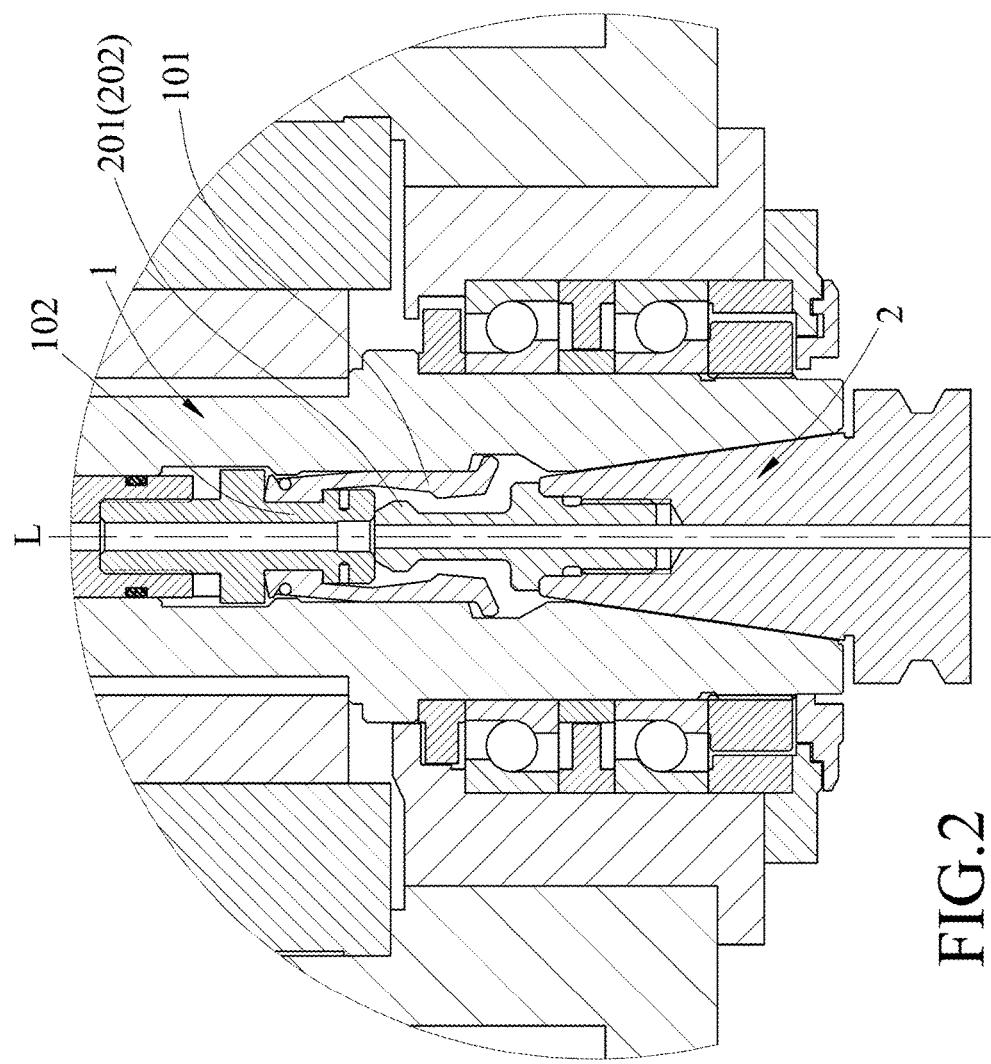
FIG. 2 is a sectional view, illustrating a pull stud of the existing tool holder assembly unclamped by a collet of a machine spindle.
Figure 3:
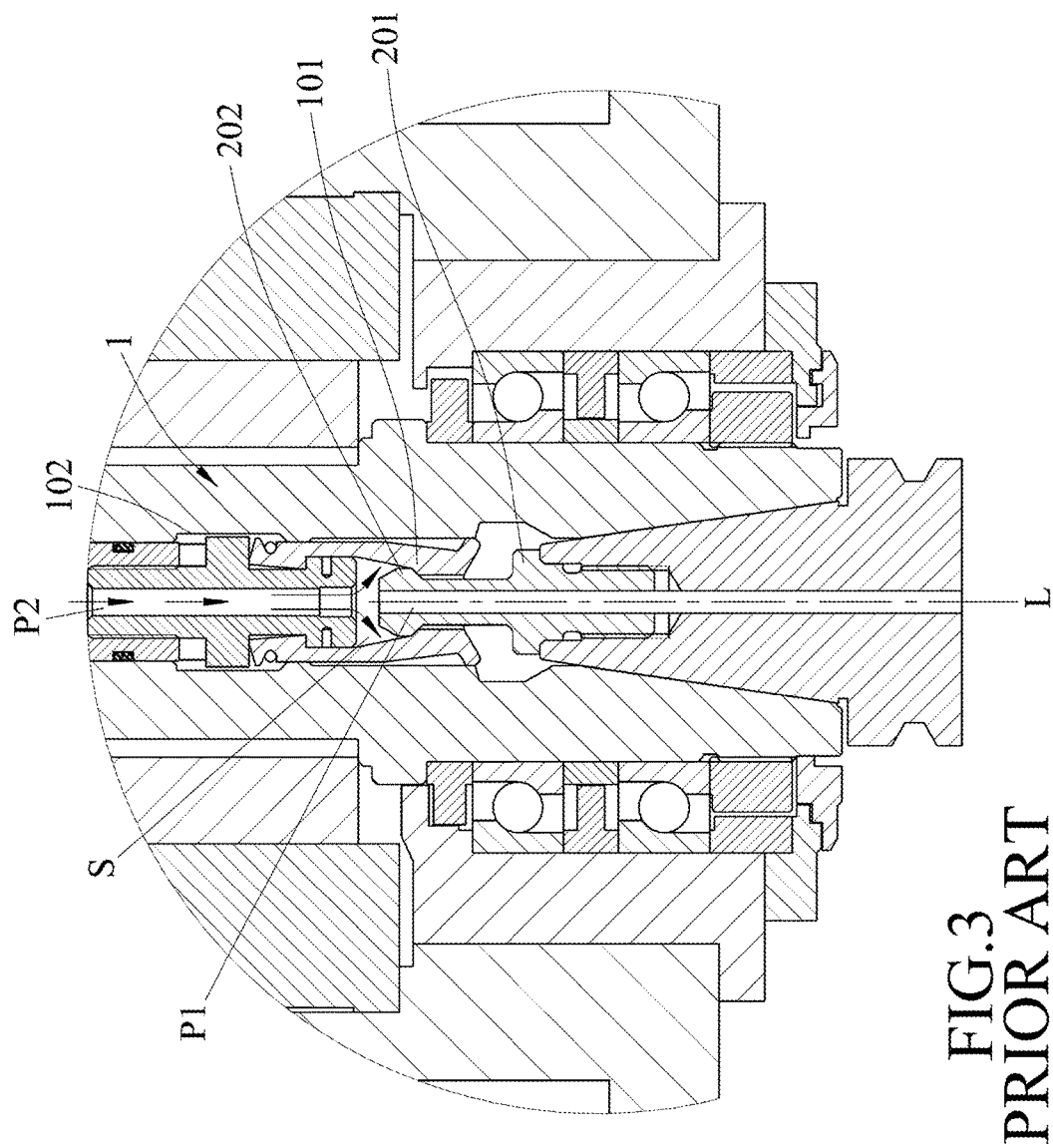
FIG. 3 is similar to FIG. 2, but illustrating the pull stud of the existing tool holder assembly clamped by the collet.

Further, in the holder body 10 of the present disclosure, the enlarged channel section 131 of the coolant channel 13 is provided with a depth larger than that of the existing holder body shown in FIGS. 1 to 3. Therefore, the holder body 10 can be made by modifying and processing the existing holder body without a need to provide special design for the fabrication thereof, thereby reducing the fabrication cost.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A tool holder assembly comprising:
   a holder body extending along an axial line, and having a first end, a second end opposite to said first end along the axial line, and a holder coolant channel extending through said first end and said second end along the axial line;
   a pull stud extending along the axial line into said holder body through said first end, and having an insertion portion, a grip portion, and a longitudinal passage, said insertion portion being disposed adjacent to said first end, said grip portion being opposite to said insertion portion along the axial line, said longitudinal passage extending through said insertion portion and said grip portion along the axial line, and fluidly communicating with said holder coolant channel; and
   a flow adjustment unit including a connection tube extending into said longitudinal passage, a resilient member urging said connection tube to project outwardly from said grip portion, and a flow guide channel extending through said connection tube and fluidly communicating with said holder coolant channel.

2. The tool holder assembly as claimed in claim 1, which is adapted to mount on a machine spindle, the machine spindle having a drawbar, and a collet coupled to and moved by the drawbar, wherein said grip portion is configured to be clamped by the collet to position said tool holder assembly to the machine spindle, said connection tube is configured to sealingly abut the drawbar when said grip portion of said pull stud is pulled by the collet of the machine spindle.

3. The tool holder assembly as claimed in claim 2, wherein said flow adjustment unit further includes a retention tube connected to said connection tube and disposed in said pull stud and said holder body, said resilient member abutting said holder body and said retention tube.

4. The tool holder assembly as claimed in claim 3, wherein said holder coolant channel has a stepwise configuration and has an enlarged channel section that is proximal to said first end of said holder body, and a narrowed channel section that connects said enlarged channel section and is proximal to said second end of said holder body, said retention tube and said resilient member being disposed in said enlarged channel section.

5. The tool holder assembly as claimed in claim 1, wherein said connection tube has an abutment end disposed at the outside of said grip portion, said abutment end having a disc-like shape, said flow guide channel of said flow adjustment unit being a stepwise hole that has a widened channel part in said abutment end.

6. The tool holder assembly as claimed in claim 5, wherein said abutment end has an end surface perpendicular to the axial line, said widened channel part being concaved from said end surface, said flow adjustment unit further including a seal ring that is disposed in said widened channel part and that is adjacent to said end surface.

7. A tool holder assembly mountable on a machine spindle having a spindle coolant channel, a drawbar and a collet, comprising:
   a holder body having a first end, a second end opposite to said first end, and a holder coolant channel extending through said first end and said second end;
   a pull stud having an insertion portion, a grip portion, and a longitudinal passage, said insertion portion extending into said holder coolant channel through said first end, said grip portion being configured to be pulled by the collet of the machine spindle and disposed oppositely of said insertion portion and outwardly of said holder coolant channel, said longitudinal passage extending through said insertion portion and said grip portion, and fluidly communicating with said holder coolant channel; and
   a flow adjustment unit including a connection tube that extends into said longitudinal passage and projects outwardly from said grip portion and that is configured to sealingly abut the drawbar of the machine spindle, a resilient member urging said connection tube to project outwardly from said grip portion, and a flow guide channel extending through said connection tube and fluidly communicating with said holder coolant channel.

8. The tool holder assembly as claimed in claim 7, wherein said flow adjustment unit further includes a retention tube connected to said connection tube within said pull stud and partially extending into said holder coolant channel of said holder body, said resilient member being disposed in said holder coolant channel and abutting said holder body and said retention tube, said flow guide channel extending through said connection tube (31) and said retention tube.

9. The tool holder assembly as claimed in claim 8, wherein said holder coolant channel has an enlarged channel section and a narrowed channel section, said enlarged channel section being proximal to said first end of said holder body, said narrowed channel section connecting said enlarged channel section and being proximal to said second end of said holder body, said retention tube and said resilient member being disposed in said enlarged channel section.

10. The tool holder assembly as claimed in claim 7, wherein said connection tube has an abutment end disposed at the outside of said grip portion, said abutment end having a disc-like shape, said flow guide channel of said flow adjustment unit having a widened channel part in said abutment end.

11. The tool holder assembly as claimed in claim 10, wherein said widened channel part opens at an end surface of said abutment end, said flow adjustment unit further including a seal ring that is disposed in said widened channel part and that is configured to sealingly abut the drawbar of the machine spindle.

\* \* \* \* \*